(12) United States Patent
Bugash et al.

(10) Patent No.: US 7,965,948 B1
(45) Date of Patent: Jun. 21, 2011

(54) POWER AND DATA TRANSMITTED OVER A SINGLE OPTICAL FIBER

(75) Inventors: Robert S. Bugash, Weybridge, VT (US); Robert L. Zeliff, Bridport, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 729 days.

(21) Appl. No.: 12/006,625

(22) Filed: Jan. 4, 2008

(51) Int. Cl.
*H04B 10/04* (2006.01)
*H04B 10/06* (2006.01)
*H04B 10/08* (2006.01)

(52) U.S. Cl. .......... 398/197; 398/208; 398/209; 398/33
(58) Field of Classification Search ............... 398/168, 398/171, 33, 197, 208, 209
See application file for complete search history.

(56) References Cited

U.S. PATENT DOCUMENTS

| | | | |
|---|---|---|---|
| 4,346,478 A * | 8/1982 | Sichling | 398/107 |
| 4,820,916 A * | 4/1989 | Patriquin | 250/208.2 |
| 4,963,729 A * | 10/1990 | Spillman et al. | 250/227.21 |
| 5,207,099 A | 5/1993 | Baker | |
| 2004/0035461 A1 * | 2/2004 | Susko | 137/209 |

OTHER PUBLICATIONS

U.S. Appl. No. 12/006,626, filed Jan. 4, 2008, Bugash et al.

* cited by examiner

*Primary Examiner* — Dalzid Singh
(74) *Attorney, Agent, or Firm* — Muirhead and Saturnelli, LLC

(57) ABSTRACT

Transmitting power and data to electronic components using a single optical fiber includes receiving a light power signal via the single fiber optic, converting the power light signal to electrical energy, at least a portion of which may be stored in an energy storage element, and, in response to a pause in the received light power signal, transmitting a light data signal via the single optical fiber, where power used in connection with data transmission is provided by electrical energy stored in the energy storage element. A photovoltaic element may be used to convert the light power signal into electrical energy. The photovoltaic element may be an array of photodiodes or a single photodiode. The energy storage element may be a capacitor. Transmitting a light data signal may be provided by a communication light source.

29 Claims, 4 Drawing Sheets

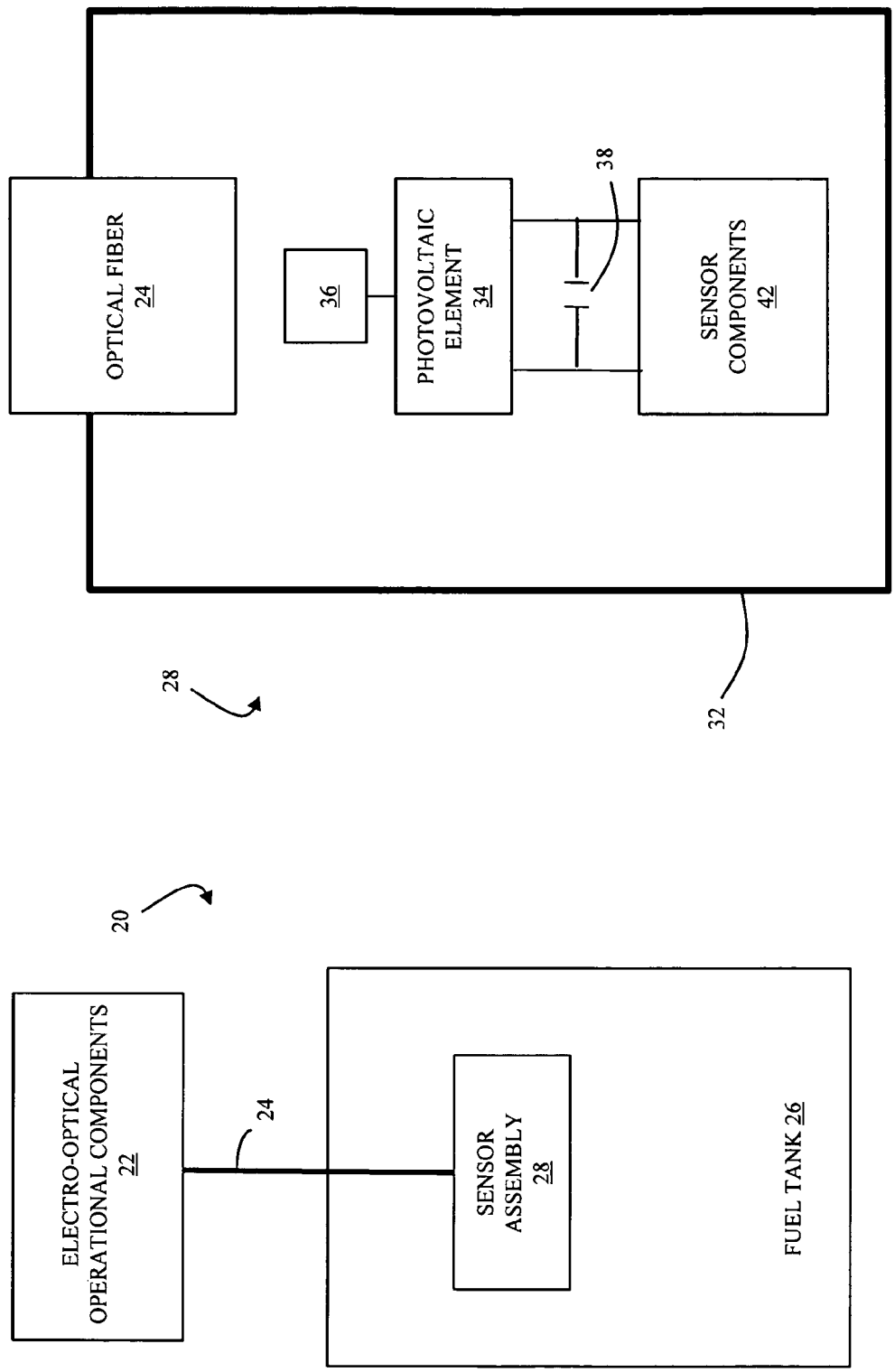

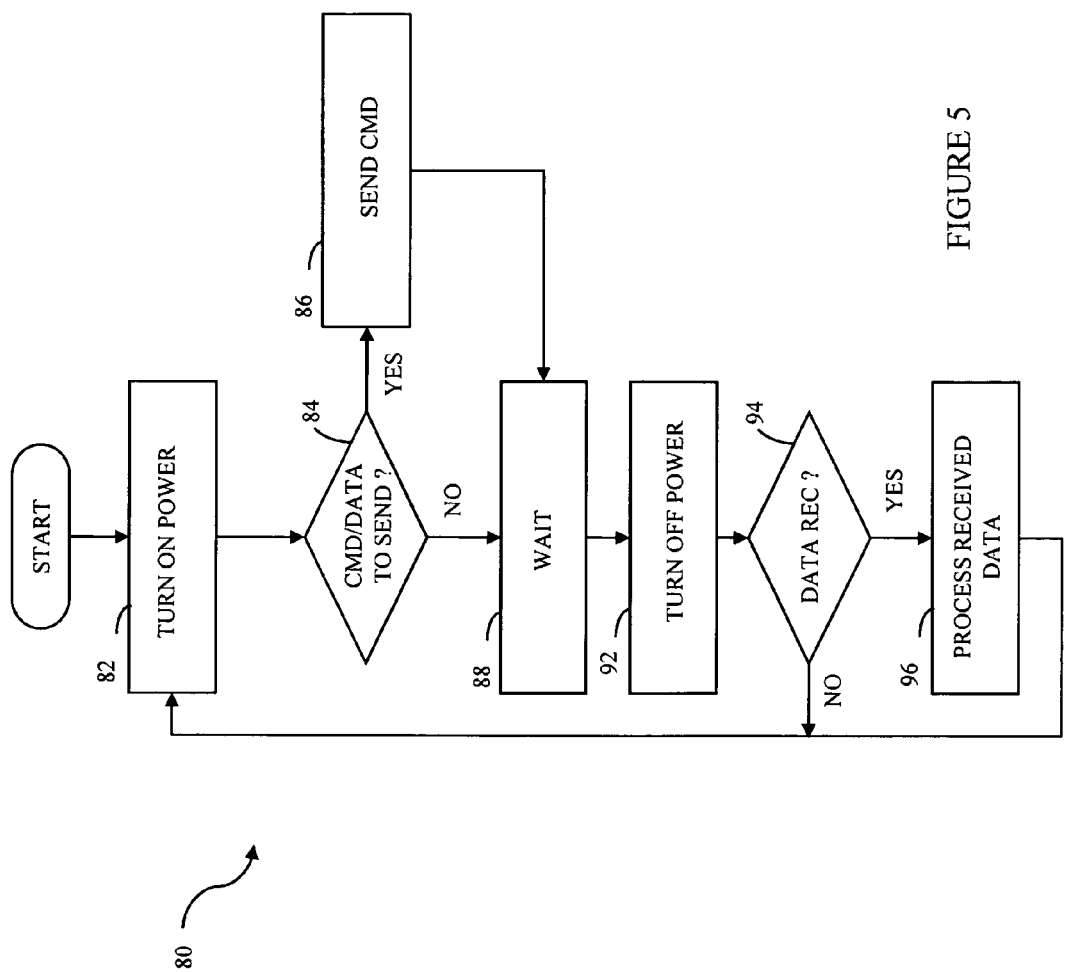

US 7,965,948 B1

POWER AND DATA TRANSMITTED OVER A SINGLE OPTICAL FIBER

BACKGROUND OF THE INVENTION

1. Technical Field

This application relates to the field of electronic components, and more particularly to the field of providing power and communicating data with electronic components.

2. Description of Related Art

Electrical wires are used to provide power to electrical components and/or for transmitting and receiving data signals with the components. However, in some instances, it is desirable to avoid running electrical wires directly to the components. For example, in an explosive atmosphere such as found in aircraft fuel tanks, the use of electrical wires may pose a hazard.

One way to avoid using electrical wires is to use optical fibers for providing power to electronic sensor components and for exchanging data with the components. An optical fiber may be used to carry light energy that is converted to electrical power within the components by converting the light energy to electrical energy with a photovoltaic device such as a photodiode. Additional optical fibers may be used for data communication with the components. However, running multiple optical fibers to each component may be costly and may add undesirable complexity.

Accordingly, it is desirable to provide a system that uses optical fibers for power delivery and data communication with electronic components while reducing the number of optical fibers that are needed.

SUMMARY OF THE INVENTION

According to the system described herein, transmitting power and data to electronic components using a single optical fiber includes receiving a light power signal via the single fiber optic, converting the power light signal to electrical energy, at least a portion of which is stored in an energy storage element, and, in response to a pause in the received light power signal, transmitting a light data signal via the single optical fiber, where power used in connection with data transmission is provided by electrical energy stored in the energy storage element. A photovoltaic element may be used to convert the light power signal into electrical energy. The photovoltaic element may be an array of photodiodes or a single photodiode. The energy storage element may be a capacitor. Transmitting a light data signal may be provided by a communication light source. The electronic components may be part of a sealed assembly that includes the energy storage element. The sealed assembly may measure pressure in a fuel tank. Only the optical fiber may extend from outside the sealed assembly to inside the sealed assembly.

According further to the system described herein, a sealed electronic component assembly includes a sealed housing, an optical fiber extending from inside the housing to outside the housing, a photovoltaic element, disposed within the housing and coupled to the optical fiber, a communication light source, disposed within the housing and coupled to the optical fiber, an energy storage element, disposed within the housing and coupled to the photovoltaic element and the communication light source, where the energy storage element stores electrical energy generated by the photovoltaic element and where the energy storage element provides electrical energy to the communication light source, and a controller, coupled to the communication light source, where in response to no light being received via the optical fiber, the controller causes the communication light source to transmit data from the component assembly via the optical fiber. The photovoltaic element may be an array of photodiodes or a single photodiode. The energy storage element may be a capacitor. The sealed electronic component assembly may also include a pressure sensor disposed within the housing. Only the optical fiber may extend from outside the housing to inside the housing.

According further to the system described herein, a controller for a sealed electronic component assembly includes an input that receives a light data signal from an optical fiber coupled to the electronic component assembly, an input that receives electrical energy from a photovoltaic element that converts light received via the optical fiber into electrical energy and/or an energy storage element coupled to the photovoltaic element, and an output that causes data to be transmitted from the electronic component assembly via the optical fiber when no light is being received by the photovoltaic element. A received light data signal may provide commands to the controller. The commands may include reset, calibrate, collect data in a certain mode, shut down, and start up. The photovoltaic element may be an array of photodiodes or a single photodiode. The energy storage element may be a capacitor. The controller may also include a pressure sensor disposed within the housing. Only the optical fiber may extend from outside the housing to inside the housing.

BRIEF DESCRIPTION OF THE DRAWINGS

Embodiments of the system are described with reference to the several figures of the drawings, in which:

FIG. 1 is a schematic diagram illustrating a sensor assembly, a fuel tank, and a fiber optic connection according to an embodiment of the system described herein.

FIG. 2 is a schematic diagram illustrating a sensor assembly according to an embodiment of the system described herein.

FIG. 5 is a flow chart illustrating steps performed by electro-optical operational components communicating with a sensor assembly according to an embodiment of the system described herein.

DETAILED DESCRIPTION OF VARIOUS EMBODIMENTS

Figure 3:
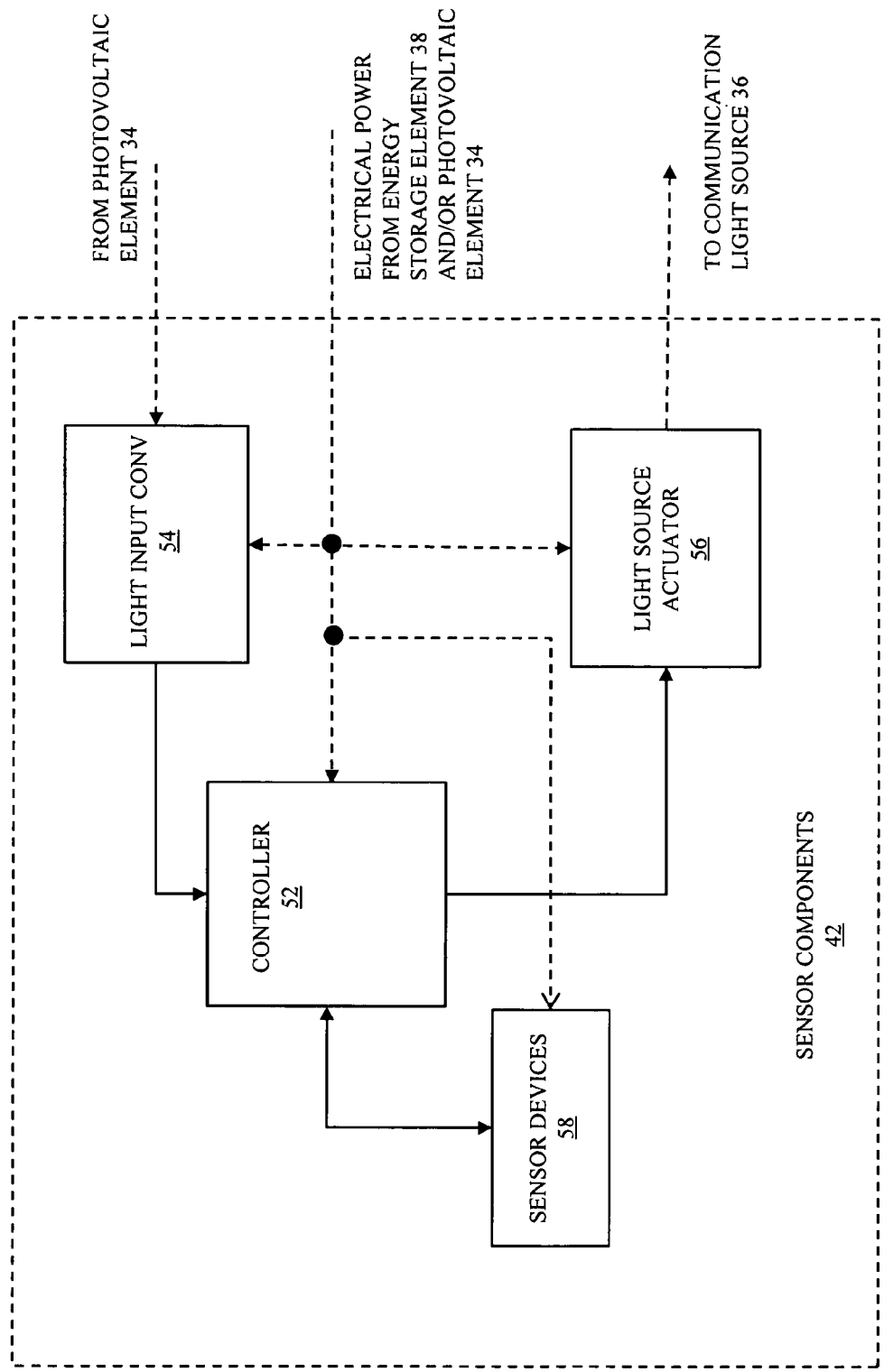
FIG. 3 is a schematic diagram illustrating sensor components according to an embodiment of the system described herein.

Referring now to the figures of the drawings, the figures comprise a part of this specification and illustrate exemplary embodiments of the described system. It is to be understood that in some instances various aspects of the system may be shown schematically or may be exaggerated or altered to facilitate an understanding of the system.

Referring to FIG. 1, a system 20 includes electro-optical operational components 22, an optical fiber 24, and a fuel tank 26 that contains a sealed sensor assembly 28. The optical fiber 24 couples the electro-optical components 22 to the sensor assembly 28 within the fuel tank 26. The optical fiber 24 passes through a wall of the fuel tank 26 and is coupled to the sensor assembly 28 in an appropriate fashion using, for example, any one of a number of conventional techniques to maintain the seal. Although not shown explicitly in FIG. 1, there may be other components within the fuel tank 26, each coupled to a different optical fiber. The different optical fibers may be coupled to the electro-optical components 22 or to one or more different electro-optical components (not shown).

The electro-optical operational components 22 handle sending a light signal to the sensor assembly 28 using the optical fiber 24. The electro-optical operational components 22 also send and receive data signals to and from the sensor assembly 28 via the same optical fiber in a manner discussed in more detail elsewhere herein. The electro-optical operational components 22 may be implemented using conventional components such as a microcontroller, components for sending and receiving light data signals, etc. in accordance with the description herein. The electro-optical operational components 22 may be located at any distance from the sensor assembly 28 according to the length and transmission capability of the optical fiber 24.

The sensor assembly 28 may be any appropriate sensor that may be used in the fuel tank 26. In an embodiment herein, the sensor assembly 28 is a self-contained sealed pressure sensor that detects the pressure of fuel in the fuel tank 26. However, other types of sensors may be used, including capacitance sensors, temperature sensors, ultrasonic sensors, and resistance sensors that may measure fuel height, volume, density, flow, contamination, etc.

The sensor assembly 28 provides a light signal indicative of sensor data to the electro-optical components 22 via the optical fiber 24 while, as mentioned above, the sensor assemble also receives a light signal via the optical fiber 24. As discussed in more detail herein, the light signal from the electro-optical components 22 provide both power and data to the sensor assembly 28 while the light signal from the sensor assembly 28 provides data to the electro-optical components 22.

Referring to FIG. 2, the sensor assembly 28 is shown as including a seal 32 through which the optical fiber 24 passes. The seal 32 prevents fuel in the fuel tank 26 from coming in to contact with components of the sensor assembly 28. Accordingly, fuel is present outside the seal 32, but not inside the seal 32. The seal may be formed around the optical fiber 24, or a gasket (not shown) may be used between the seal 32 and the optical fiber 24, or any other appropriate technique may be used to prevent the passage of fuel to components of the sensor assembly 28.

The sensor assembly 28 includes a photovoltaic element 34 that receive light from the optical fiber 24 and convert the light to electrical energy to power the sensor assembly. In an embodiment herein, the photovoltaic element 34 may be implemented using an array of six photodiodes made by JDSU part number PPC6E that generates the appropriate voltage level. However, in other embodiments, a different number of photodiodes, a single photodiode, or any appropriate device or group of devices may be used that is capable of generating a voltage sufficient to operate components of the sensor assembly 28. The photovoltaic element 34 may be used to generate electrical power and to receive/convert any light data signals provided to the sensor assembly 28 via the optical fiber 24.

The sensor assembly 28 also includes a communication light source 36, such as a Vertical Cavity Surface Emitting Laser (VCSEL) laser manufactured by Finisar, Advanced Optical Components part number HFE4094-392, that provides light signals to the optical fiber 24 to communicate information from the sensor assembly 28. For example, if the sensor assembly 28 is for a pressure sensor, then the sensor assembly 28 could communicate data indicative of measured pressure using the communication light source 36. The data may be communicated in a digital format using any appropriate protocol, such as the RS-232 protocol at 32,768 baud, or any one of a number of other appropriate data communication protocols, including publicly available protocols.

The communication light source 36 may be mounted between the photovoltaic element 34 and the optical fiber 24. In an embodiment herein, the communication light source 36 is significantly smaller and mounted concentrically or nearly concentrically with the photovoltaic element 34. This allows operation of the communication light source 36 to provide light signals to the optical fiber 24 while, at the same time, the photovoltaic element 34 may receive light signals from the optical fiber 24. In instances where the photovoltaic element 34 is implemented as an array of photodiodes, the photodiodes may be located about the circumference of the communication light source 36.

The sensor assembly 28 also includes an energy storage element 38 that stores electrical energy generated by the photovoltaic element 34. The energy storage element 38 may be coupled to the photovoltaic element 34. The energy storage element 38 may be implemented using any appropriate component capable of temporarily storing electrical energy (e.g., a capacitor) consistent with the description herein. The energy storage element 38 provides electrical energy to the sensor assembly 28 when no light is being provided via the optical fiber 24. As described in more detail elsewhere herein, the electro-optical operational components 22 periodically stop sending light to power the sensor assembly 28 so that the power sensor assembly 28 may communicate data (e.g., pressure sensor data) back to the electro-optical operational components 22.

The sensor assembly 28 also includes sensor components 42 that are coupled to the photovoltaic element 34, the communication light source 36, and the energy storage element 38. In an embodiment herein, all electrical energy received by the sensor assembly 28 may be stored in the energy storage device and subsequently provided to the sensor components 42 as needed. The sensor components 42 handle exchanging data between the sensor assembly 28 and the electro-optical operational components 22.

Referring to FIG. 3, the sensor components 42 are shown in more detail as including a controller 52, a light input converter 54, a light source actuator 56, and sensor devices 58. The controller 52 may be implemented in any appropriate fashion and may include a conventional microprocessor/RAM/ROM configuration or similar for providing the functionality described herein. The controller 52 receives electrical energy for power from the energy storage element 38 and/or from the photovoltaic element 34.

The light input converter 54 is coupled to the photovoltaic element 34 and converts light signals therefrom into data/commands for the controller 52. As discussed elsewhere herein, the electro-optical operational components 22 may provide data/commands to the sensor assembly 28 via the optical fiber 24 to direct operation of the sensor assembly 28. For example, the electro-optical operational components 22 may provide commands instructing the sensor assembly 28 to reset, to recalibrate, to collect data in a certain mode, to shut down, to start up, etc. The data/commands may be provided using any appropriate digital format and protocol. For example, the digital data may be provided by having the electro-optical components 22 turning the light signal used for power on and off, by turning off the light signal used for power and then sending a separate data light signal, by modulating a digital light signal on top of a relatively constant power light signal, etc. The light input converter 54 receives electrical energy for power from the energy storage element 38 and/or from the photovoltaic element 34. In some embodiments, the light input converter 54 may receive light signals directly from the optical fiber 24 and/or from a source other than the photovoltaic element 34.

The light source actuator 56 receives data signals from the controller 52 and actuates the communication light source 36 to send the data from the sensor assembly 28 to the electro-optical operational components 22 via the optical fiber 24. The data may be provided in any appropriate format/protocol. For example, the data may be provided in a digital format by turning the communication light source 36 on and off. The light source actuator 56 receives electrical energy for power from the energy storage element 38 and/or from the photovoltaic element 34. In some instances, at least some of the electrical energy may be received via the light input converter 54.

The sensor devices 58 include electronic devices that measure a physical parameter for the sensor assembly 28. For example, if the sensor assembly 28 measures pressure, then the sensor components 42 may include an electronic pressure sensor. Similarly, if the sensor assembly 28 measures temperature, then the sensor components 42 may include an electronic temperature sensor. The sensor devices 58 exchange data with the controller 52. The sensor devices 58 receive electrical energy for power from the energy storage element 38 and/or from the photovoltaic element 34.

Figure 4:
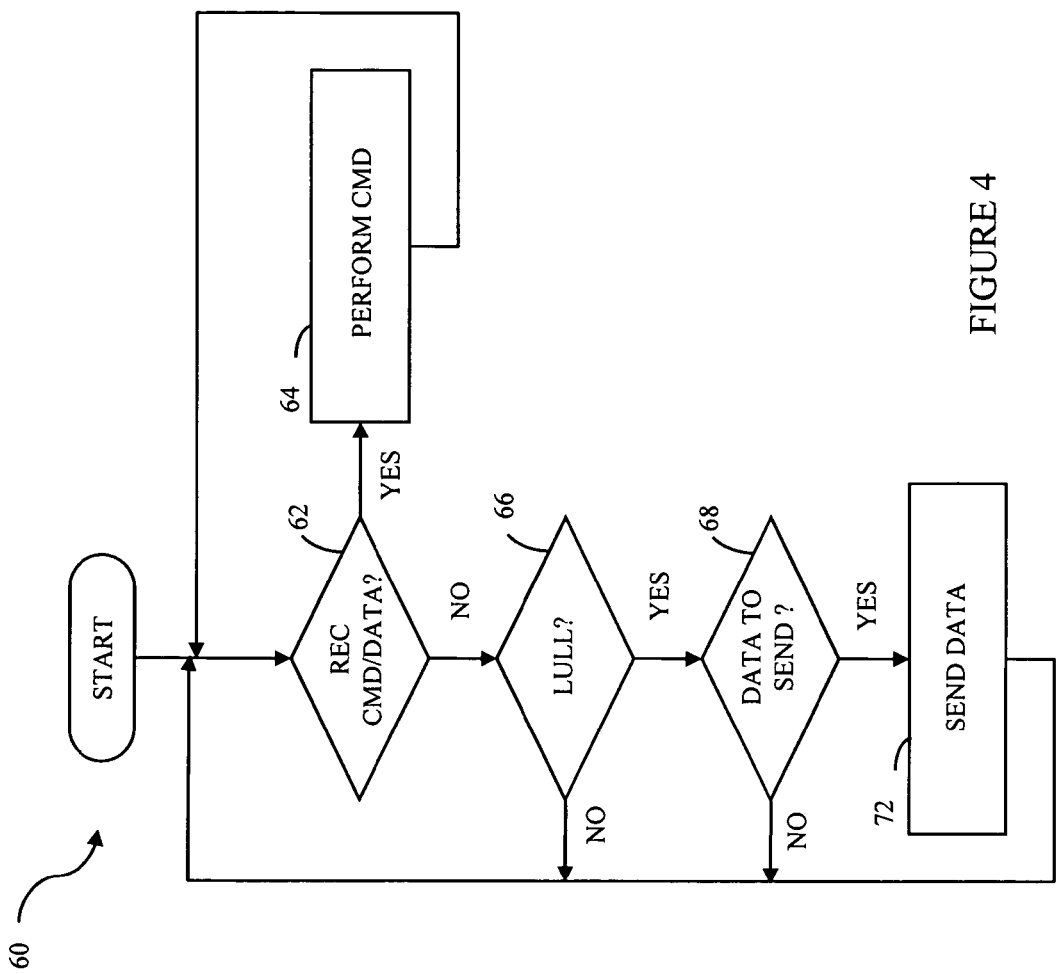
FIG. 4 is a flow chart illustrating steps performed by a controller of a sensor assembly according to an embodiment of the system described herein.

Referring to FIG. 4, a flow chart 60 illustrates operation of the controller 52 in connection with exchanging data between the sensor assembly 28 and the electro-optical operational components 22. Processing begins at a first test step 62 where it is determined if the controller has received a command (e.g., reset, calibrate, change data collection mode, etc.) from the electro-optical operational components 22. As discussed elsewhere herein, the electro-optical operational components 22 may provide data/commands to the sensor assembly 28 via the optical fiber 24. The data/commands are received by the light input converter 54 and provided to the controller 52. If it is determined at the test step 62 that new commands/data have been received, then control passes from the step 62 to a step 64 where the received command (e.g., reset, calibrate, etc.) is performed. Following the step 64, control passes back to the step 62 for another iteration.

If it is determined at the test step 62 that no command has been received, then control passes from the test step 62 to a test step 66 where it is determined if there is a lull in the light power signal sent from the electro-optical operational components 22. In an embodiment herein, the electro-optical operational components 22 periodically (and/or intermittently) turn off the light power signal provided to the sensor assembly 28 via the optical fiber 24 in order to allow the sensor assembly 28 to transmit data back to the electro-optical operational components 22. This advantageously allows for a single optical fiber to be used for both power transmission and data transmission.

If it is determined at the test step 66 that there is not a lull in receipt of the light power signal, then control transfers from the test step 66 back to the test step 62 for another iteration. Otherwise, control transfers from the test step 66 to a test step 68 where it is determined if there is data to be sent. In some embodiments, data may be sent every time there is a lull. In other embodiments, data may only be sent periodically (e.g., every nth lull) or intermittently, or only when the data has changed, etc.

If it is determined at the test step 68 that there is no data to send from the sensor assembly 28 back to the electro-optical operational components 22, then control transfers from the test step 68 back to the step 62 for another iteration. Otherwise, control transfers from the test step 68 to a step 72 where the data is sent using the light source actuator 56 as described elsewhere herein. Following the step 72, control transfers back to the step 62 for another iteration.

Referring to FIG. 5, a flow chart 80 illustrates steps performed by the electro-optical operational components 22 in connection with communicating with and providing power to the sensor assembly 28. Processing begins at a first step 82 where the light power signal for powering the sensor assembly is turned on. Following the step 82 is a test step 84 where the electro-optical operational components 22 determine if there are any data/commands (e.g., reset, calibrate, etc.) to be sent to the sensor assembly 28. If so, then control passes from the test step 84 to a step 86 where the data/commands are sent using any appropriate format/technique (e.g., superimposing digital light signal data on to the power light signal, turning the light signal on and off, etc.).

Following the step 86, or following the test step 84 if there are not commands to be sent is a step 88 where the electro-optical operational components wait for an amount of time corresponding to the period of operation (checking for data) of the electro-optical operational components 22. In an embodiment herein, the wait at the step 88 may be 50 milliseconds, although other time periods may be used. The period may be set to allow for appropriate data transmission/throughput to and from the sensor assembly 28. Note also that the step 88 may be eliminated altogether, in which case the electro-optical operational components 22 are continuously looking for data from the sensor assembly 28.

Following the step 88 is a step 92 where the electro-optical operational components 22 turn off the light signal used to power the sensor assembly 28. Following the step 92 is a test step 94 where the electro-optical operational components determine if data has been received from the sensor assembly 28. As discussed elsewhere herein, in some instances, the sensor assembly 28 may not transmit data every time the electro-optical operational components 22 turn off the power light signal. If it is determined at the step 94 that no data from the sensor assembly 28 has been received, then control passes from the test step 94 back to the step 82 for another iteration. Otherwise, control passes from the test step 94 to a step 96 where the received data is processed (e.g., stored, broadcast to other system components, etc.). Following the step 96, control transfers back to the step 82 for another iteration.

The system described herein may be implemented using the hardware described herein, variations thereof, or any other appropriate hardware capable of providing the functionality described herein. Thus, for example, one or more devices having components as described herein may, alone or in combination with other devices, provide an appropriate platform that executes any of the steps described herein. The system also includes computer software, stored in a computer-readable medium, that executes any of the steps described herein. In some instances, the particular ordering illustrated in the flow charts may be modified without departing from the spirit and scope of the invention.

Other embodiments Of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of transmitting power and data to electronic components using a single optical fiber, comprising:

receiving a light power signal via the single fiber optic;

converting the light power signal to electrical energy, at least a portion of which is stored in an energy storage element;

controlling transmission of the light power signal to cause a pause in the light power signal received via the single fiber optic; and in response to the pause in the received light power signal, transmitting a light data signal via the single optical fiber according to a transmission policy, wherein power used in connection with data transmission is provided by electrical energy stored in the energy storage element.

2. A method, according to claim 1, wherein a photovoltaic element is used to convert the light power signal into electrical energy.

3. A method, according to claim 2, wherein the photovoltaic element is an array of photodiodes.

4. A method, according to claim 2, wherein the photovoltaic element is a single photodiode.

5. A method, according to claim 1, wherein the energy storage element is a capacitor.

6. A method, according to claim 1, wherein transmitting a light data signal is provided by a communication light source.

7. A method, according to claim 1, wherein the electronic components are part of a sealed assembly that includes the energy storage element.

8. A method, according to claim 7, wherein the sealed assembly measures pressure in a fuel tank.

9. A method, according to claim 7, wherein only the optical fiber extends from outside the sealed assembly to inside the sealed assembly.

10. The method according to claim 1, wherein the transmission policy includes a policy of sending the light data signal periodically according to a plurality of detected pauses in the light power signal.

11. The method according to claim 1, wherein the transmission policy includes a policy of sending the light data signal only when the data has changed.

12. A sealed electronic component assembly, comprising:
a sealed housing;
an optical fiber extending from inside the housing to outside the housing;
a photovoltaic element, disposed within the housing and coupled to the optical fiber, wherein the photovoltaic element receives a light power signal transmitted via the optical fiber;
a communication light source, disposed within the housing and coupled to the optical fiber;
an energy storage element, disposed within the housing and coupled to the photovoltaic element and the communication light source, wherein the energy storage element stores electrical energy generated by the photovoltaic element and wherein the energy storage element provides electrical energy to the communication light source; and
a controller, coupled to the communication light source, wherein in response to a pause in the light power signal being received via the optical fiber, the controller determines whether to cause the communication light source to transmit data from the component assembly via the optical fiber based on a transmission policy and, in accordance with the transmission policy, causes transmission of the data from the component assembly via the optical fiber.

13. A sealed electronic component assembly, according to claim 12, wherein the photovoltaic element is an array of photodiodes.

14. A sealed electronic component assembly, according to claim 12, wherein the photovoltaic element is a single photodiode.

15. A sealed electronic component assembly, according to claim 12, wherein the energy storage element is a capacitor.

16. A sealed electronic component assembly, according to claim 12, further comprising:
a pressure sensor disposed within the housing.

17. A sealed electronic component assembly, according to claim 12, wherein only the optical fiber extends from outside the housing to inside the housing.

18. The sealed electronic component assembly according to claim 12, wherein the transmission policy includes a policy of sending the data periodically according to a plurality of detected pauses in the light power signal.

19. The sealed electronic component assembly according to claim 12, wherein the transmission policy includes a policy of sending the data only when the data has changed.

20. A controller for a sealed electronic component assembly, comprising:
an input that receives a light data signal from an optical fiber coupled to the electronic component assembly;
an input that receives electrical energy from at least one of:
a photovoltaic element that converts a light power signal received via the optical fiber into electrical energy and an energy storage element coupled to the photovoltaic element;
a processor that determines based on a transmission policy, whether data is to be transmitted from the electronic component assembly via the optical fiber in response to a pause in the light power signal; and
an output that causes the data be to transmitted according to the transmission policy.

21. A controller, according to claim 20, wherein a received light data signal provides commands to the controller.

22. A controller, according to claim 21, wherein the commands include reset, calibrate, collect data in a certain mode, shut down, and start up.

23. A controller, according to claim 20, wherein the photovoltaic element is an array of photodiodes.

24. A controller, according to claim 20, wherein the photovoltaic element is a single photodiode.

25. A controller, according to claim 20, wherein the energy storage element is a capacitor.

26. A controller, according to claim 20, further comprising:
a pressure sensor disposed within the housing.

27. A controller, according to claim 20, wherein only the optical fiber extends from outside the housing to inside the housing.

28. The controller according to claim 20, wherein the transmission policy includes a policy of sending the data periodically according to a plurality of detected pauses in the light power signal.

29. The controller according to claim 20, wherein the transmission policy includes a policy of sending the data only when the data has changed.

* * * * *